United States Patent Office 3,231,360
Patented Jan. 25, 1966

3,231,360
HERBICIDAL METHOD
Peter E. Newallis, Morris Plains, N.J., and John P. Chupp and Joseph W. Baker, Kirkwood, Mo., assignors to Monsanto Company, a corporation of Delaware
No Drawing. Original application Sept. 11, 1959, Ser. No. 839,286. Divided and this application June 15, 1962, Ser. No. 202,680
5 Claims. (Cl. 71—2.6)

This application is a division of our application Serial Number 839,286, filed September 11, 1959, now abandoned.

The present invention relates to N,N-lower alkenyl substituted amides of monobromobenzoic acids. More particularly, the present invention relates to new meta-bromobenzamides and para-bromobenzamides which comprise outstanding pre-emergence herbicides, especially grass-specific herbicides, to herbicidal compositions containing these compounds and to methods of inhibiting the germination and growth of undesired plants wherein such compounds are employed.

The new compounds comprise the structure,

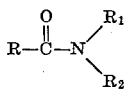

wherein R is a 3-bromophenyl or a 4-bromophenyl radical, $R_1$ is a lower alkenyl radical which may be substituted by one or more halogen atoms, preferably chlorine, linked to unsaturated carbon, and $R_2$ is the same as $R_1$ or is a lower alkyl radical.

As illustrative of compounds which come within the scope of this invention, there may be mentioned:

N,N-diisopropenyl-3-bromobenzamide
N,N-bis(2-butenyl)-3-bromobenzamide
N-allyl-N-2-butenyl-3-bromobenzamide
N,N-bis(2-chloroallyl)-3-bromobenzamide
N,N-bis(3-chloro-2-butenyl)-3-bromobenzamide
N-allyl-N-ethyl-3-bromobenzamide
N-2-chloroallyl-N-isobutyl-3-bromobenzamide
N,N-bis(2,3-dibromoallyl)-3-bromobenzamide
N-allyl-N-2-chloro-3-fluoroallyl-3-bromobenzamide
N,N-bis(2,3-dichloro-2-butenyl)-3-bromobenzamide
N,N-diisobutenyl-3-bromobenzamide
N,N-bis(2-butenyl)-4-bromobenzamide
N,N-bis(3-chloro-2-butenyl)-4-bromobenzamide
N,N-diallyl-4-bromobenzamide
N,N-diisopropenyl-4-bromobenzamide
N-allyl-N-2,3-dichloroallyl-4-bromobenzamide
N-2-chloroallyl-N-2-bromoallyl-4-bromobenzamide
N,N-bis(2,3-dichloroallyl)-4-bromobenzamide
N,N-bis(2-iodoallyl)-4-bromobenzamide
N,N-bis(3-chloro-2-butenyl)-4-bromobenzamide
N,N-bis(3-butenyl)-4-bromobenzamide
N,N-bis(3,3-dichloroallyl)-3-bromobenzamide
N,N-bis(2,3,3-trichloroallyl)-3-bromobenzamide
N-(3-chloro-2-butenyl)-N-methyl-3-bromobenzamide
N-2,3-dibromoallyl-N-isopropyl-3-bromobenzamide
N-2-butenyl-N-propyl-4-bromobenzamide Included within the above broad class of compounds is a preferred group of compounds which have the structure,

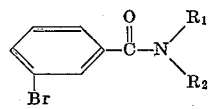

wherein $R_1$ and $R_2$ are allyl or chloroallyl radicals. N,N-diallyl-3-bromobenzamide is a particularly outstanding species.

The bromobenzamides of this invention may be prepared by the reaction of appropriate bromobenzoyl chloride with the appropriate dialkenyl amine. This reaction can be carried out in solution in an organic solvent in the presence of a hydrogen chloride acceptor, e.g., a tertiary amine or an excess of the amine reactant. Similarly the reaction can be carried out in aqueous media, as for example in a dilute aqueous solution of sodium carbonate (HCL acceptor). Because of the exothermic nature of the reaction, it is preferred to slowly add the acid chloride to the solution of the amine and hydrogen chloride acceptor. After the addition of the acid chloride is complete, and the reaction mixture has been agitated for a short period, e.g., 30 minutes to 1 hour, the N,N-dialkenyl substituted bromobenzamide can be recovered from the reaction mixture by any means known to those skilled in the art. For example, the product can be extracted from an aqueous reaction mixture by the use of a suitable organic solvent, e.g. methylene chloride; the product is then recovered by stripping off the organic solvent at sub-atmospheric pressures.

The active compound is, of course, applied in an amount sufficient to exert the desired herbicidal action. The amount of active compound present in the compositions as actually applied for preventing weeds, i.e., unwanted plants, will vary with the manner of application, the particular weeds for which the control is sought, the purpose for which the application is being made, and like variables. In general, the herbicidal compositions as applied will contain from about 1% to about 90% by weight of the bromobenzamides.

Valuable herbicidal effects will be observed by applications of small amounts, for example as low as one-half pound of active compound per acre, as well as high concentrations, for example 100 pounds per acre. As a general rule, the selective activity on grasses is exhibited at lower rates of applicataion, for example 2 to 10 pounds per acre. For general application and herbicidal effect on both grasses and dicotyledonous plants, it usually will be found necessary to use amounts in the range of 10 to 50 pounds per acre. Herbicidal compositions of the invention are prepared by admixing one or more of the bromobenzamides defined heretofore in herbicidally effective amounts, with a herbicidal conditioning agent of the kind used and referred to in the art as a pest control adjuvant or modifier to provide formulations adapted for ready and efficient application to the soil using conventional applicator equipment.

The solid formulations, frequently referred to as "dusts," may contain in addition to the active ingredient, diluents or extenders, dispersing agents to prevent local high concentration and agents to facilitate distribution in soil or soil waters. Suitable solid diluents are those which render the compositions permanently dry and freeflowing. Thus hygroscopic materials are to be avoided unless the compositions also contain a separate substance to serve as an aid to flowability. Effective solid diluents preferably pulverulent or granular in form so as to be effective carriers for the active ingredient, are the natural clays such as china clays, the bentonites and the attapulgites; other minerals in a natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil. More concentrated herbicides will require dilution by the user in order to properly condition the soil for the most effective usage. The concentrated solid herbicidal formulations can be used with less danger if they are mixed with the surface soil by means of a disk plow or harrow at the time of application.

The liquid compositions for herbicidal use may be solutions, or other liquid dispersions. The choice of a liquid medium will depend to some extent upon the physical properties of the active ingredient. The bromobenzamides are, for the most part, insoluble in water and therefore, aqueous formulations will necessarily be dispersions of minute drops or particles of the water-insoluble substances in suspension in an aqueous medium. The water-insoluble bromobenzamides of this invention may first be dissolved in a suitable organic solvent and the organic solution of the active ingredient then incorporated in water or in any aqueous medium to produce a heterogeneous dispersion of the active ingredient in water.

Many of the formulations are benefited by the incorporation of organic solvents for the active components, such as the water-immiscible organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 80 percent or more in order to provide a uniformly distributed formulation which is capable of maintaining its distributed state during storage, use and application to the soil.

The surface-active dispersing agents employed can be of the anionic, cationic, or nonionic type and include, for example, sodium and potassium oleate, the amine salts of oleic acid such as morpholine and dimethylamine oleates, the sulfonates animal and vegetable oils such as sulfonated fish and castor oils, sulfonated petroleum oils, sulfonated acrylic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol monostearate, diglycol oleate, polyethylene oxides, ethylene oxides condensation products wtih stearyl alcohol and octyl phenol, polyvinyl alcohols, salts, such as the acetate of polyamines from the reductive amination of ethylene/carbon monoxide polymers, laurylamine hydrochloride, laurylpyridinium bromine, stearyltrimethylammonium bromide, cetyldimethylbenzyl ammonium chloride, lauryl dimethylamine oxide and other simple and polymeric compositions having both hydrophillic and hydrophobic functions so as to enable the mixing of otherwise immiscible ingredients. Generally, the surface-active agents will represent only a minor portion of the formulation as used, for example, less than 15 percent and frequently as low as 0.05 percent by weight of the composition. Usually, concentrations of from 0.5 to 5 percent are found to be optimum.

A useful formulation of the herbicidal compositions may involve the solid or liquid concentrate of the active ingredient to which has been added formulation aids, one or more of the aforementioned herbicidal conditioning agents, so that the concentrates may be mixed with a suitable extender or diluent in the field at the time of use. Obviously for this purpose the dispersing or surface active agents will be present in larger concentrations so that upon dilution with water or a solid extender, compositions containing optimum proportions of dispersing agents and active ingredient will be prepared.

The herbicidal compositions are applied either as a spray or a dust to the locus or area to be protected from undesirable plant growth. Such application can be made directly upon the soil in advance of an anticipated weed infestation, as for example, in the form of a spray applied directly to the surface of the soil, or in the form of a dry powdered composition which can be dispersed in the surface soil. The phrase "applying to the soil," as used hereinafter in the specification and claims, shall be understood to refer to any method of applying the active ingredient to the soil for pre-emergence control. Regardless of the method of application employed, a readily flowable composition is required. Thus a critical aspect of this invention is the fluent carrier without which the optimum herbicidal effects cannot be achieved.

Both the solid and the liquid formulations above described are useful in the application of herbicides, because they facilitate the uniform distributing and aid in the inhibition of undesirable plants by maintaining the active ingredient in a form which enables its prompt assimilation by the plant and the efficient utilization of its phytotoxic properties. The described conditioning agents enable the proper use to achieve the desired herbicidal effects by an unskilled operator without elaborate equipment.

Fertilizer materials, other herbicidal and other pest control agents, such as fungicides and insecticides, can be included in the herbicidal compositions of the invention if desired.

The following examples are given to illustrate in detail the preparation and properties of some of the new compounds of this invention but such are not to be considered a limitation thereof.

*Example I*

To a suitable reaction vessel containing 10.7 grams of diallyl amine and 11.7 grams of sodium carbonate in 150 ml. of water, there is added slowly and with stirring 21.9 grams of 3-bromobenzoyl chloride. During the addition the temperature is maintained below 60° C. After the acid chloride addition is complete, the reaction mixture is stirred for about 1½ hours. The mixture is then cooled and allowed to separate into a lower oil layer and an upper water layer. The oil is extracted with methylene chloride and stripped at 110–120° C. (10 mm. Hg abs. press.) to give 26.1 grams of N,N-diallyl-3-bromobenzamide. This compound is an amber liquid which is insoluble in water and soluble in ether, acetone, benzene, heptene, chloroform, ethanol and ethyl acetate.

*Analysis.*—Calculated: N, 5.0. Found: 5.1.

*Example II*

The procedure of Example I is repeated except that an equivalent amount of 4-bromobenzoyl chloride is substituted for the 3-bromobenzoyl chloride. A good yield of N,N-diallyl-4-bromobenzamide is obtained. The compound is a yellow-brown solid having a melting point of 56–57° C. This compound is insoluble in water and soluble in ether, acetone, benzene, heptane, chloroform, ethanol and ethyl acetate.

*Example III.—Pre-emergence tests*

The relative value of several of the bromobenzamides as pre-emergence herbicides is determined by planting in greenhouse flats seeds of thirteen different plants, each representing a principal botanical type. A solution or suspension of the test compound is prepared by mixing 0.5 gm. of the compound in acetone or some other suitable solvent. 4.1 cc. of this stock solution is diluted to 15 cc. with the solvent used. The full 15 cc. is then sprayed over the entire area of a pre-planted pan (aluminum 9½" x 5¼" x 2¾", soil ⅝" deep, seeds ⅜" deep). This amount of chemical corresponds to a rate of approximately 25 lbs. per acre.

After spraying, the pans are placed in ½" of water and allowed to absorb moisture through the perforated bottom until the surface is about one-half moist. The pans are then transferred to a wet sand bench in a greenhouse. Fourteen days after application of the test compound, the results are observed and recorded. The number of plants of each species which germinated and grew are counted and such data are converted into herbicidal ratings, taking into account the germination and growth in the untreated plots. In the following tables of herbicidal evaluation data, these plants are represented by letters as follows:

A—Morning glory
B—Brome-cheat grass
C—Rye grass
D—Buckwheat
E—Radish-mustard
F—Sugar beet
G—Cotton
H—Corn
I—Foxtail
J—Barnyard grass
K—Crab grass
L—Field bindweed
M—Pigweed The relative value of each compound with respect to its herbicidal effect on the various plants is indicated by a number as follows:

0—No phytotoxicity
1—Slight phytotoxicity
2—Moderate phytotoxicity
3—Severe phytotoxicity

TABLE A

|  | A | B | C | D | E | F | G | H | I | J | K | L | M |
|---|---|---|---|---|---|---|---|---|---|---|---|---|---|
| N,N-diallyl-3-bromobenzamide | 0 | 2 | 3 | 2 | 1 | 3 | 0 | 1 | 3 | ---- | 3 | 1 | 3 |
| N,N-diallyl-4-bromobenzamide | 0 | 2 | 1 | 0 | 0 | 2 | 1 | 0 | 3 | 3 | 3 | 1 | 3 |

When the N,N-substituted bromobenzamides are used at lower rates of application, their specificity with respect to grasses and certain broadleaf plants is more evident. The following data demonstrate their herbicidal utility:

TABLE B
[10 lbs./acre level]

|  | A | B | C | D | E | F | G | H | I | J | K | L | M |
|---|---|---|---|---|---|---|---|---|---|---|---|---|---|
| N,N-diallyl-3-bromobenzamide | 1 | 1 | 3 | 3 | 2 | 3 | 0 | 0 | 3 | 3 | 3 | 1 | 3 |
| N,N-diallyl-4-bromobenzamide | 3 | 1 | 1 | 2 | 1 | 3 | 3 | 0 | 3 | 3 | 3 | 3 | 3 |

The following data demonstrate the herbicidal utility of compounds of this invention at lower rates of application.

TABLE C
[5 lbs./acre level]

|  | A | B | C | D | E | F | G | H | I | J | K | L | M |
|---|---|---|---|---|---|---|---|---|---|---|---|---|---|
| N,N-diallyl-3-bromobenzamide | 0 | 1 | 1 | 2 | 2 | 2 | 0 | 0 | 3 | 3 | 3 | 2 | 3 |
| N,N-diallyl-4-bromobenzamide | 2 | 0 | 0 | 1 | 1 | 1 | 1 | 0 | 3 | 3 | 2 | 2 | 3 |

The data in Table C demonstrates the outstanding herbicidal efficiency of the preferred compounds of this invention. It should be noted that N,N-diallyl-3-bromobenzamide has a higher degree of grass specificity than the analogous 4-bromobenzamide. N,N-diallyl-3-bromobenzamide is especially useful in inhibiting the growth of the most prevalent lawn weeds, e.g. crab grass, pigweed, lamps quarter (sugar beet family), foxtail grass and barnyard grass.

The data in the following table shows that the analogous benzamides possess little or no herbicidal activity.

TABLE D

|  | Rate, lbs./acre | A | B | C | D | E | F | G | H | I | J | K | L | M |
|---|---|---|---|---|---|---|---|---|---|---|---|---|---|---|
| N,N-diallyl-3-chlorobenzamide | 25 | 0 | 0 | 0 | 0 | 0 | 0 | 0 | 0 | 0 | 0 | 0 | 0 | 0 |
|  | 10 | 0 | 0 | 0 | 0 | 0 | 0 | 0 | 0 | 0 | 0 | 0 | 0 | 0 |
| N,N-diallyl-4-chlorobenzamide | 5 | 0 | 2 | 0 | 0 | 0 | 1 | 0 | 0 | 1 | 0 | 0 | 0 | 1 |
| N,N-diethyl-4-bromobenzamide | 10 | 0 | 0 | 1 | 0 | 1 | 2 | 1 | 0 | 1 | 1 | 2 | 0 | 3 |
| N-allyl-4-chlorobenzamide | 25 | 0 | 0 | 0 | 0 | 0 | 0 | 0 | 0 | 0 | 0 | 0 | 0 | 0 |

Results similar to those obtained in Tables A and B above are obtained when the following bromobenzamides are tested as above:

N,N-bis(2-chloroallyl)-3-bromobenzamide
N,N-bis(2,3-dichloroallyl)-3-bromobenzamide
N,N-diisopropenyl-3-bromobenzamide
N,N-bis(2-butenyl)-3-bromobenzamide
N-3-chloro-2-butentyl-N-2-butenyl-3-bromobenzamide
N,N-bis(3-butenyl)-4-bromobenzamide
N,N-bis(2-chloroallyl)-4-bromobenzamide
N,N-bis(2,3-dichloroallyl)-4-bromobenzamide
N,N-bis(2-chloro-3-fluoroallyl)-4-bromobenzamide
N,N-bis(3-iodoallyl)-4-bromobenzamide
N,N-bis(3,3-dichloroallyl)-3-bromobenzamide N,N-bis(2,3,3-trichloroallyl)-4-bromobenzamide
N-allyl-N-ethyl-3-bromobenzamide
N-2-chloroallyl-N-isobutyl-3-bromobenzamide
N-3-chloro-2-butenyl-N-methyl-3-bromobenzamide Selective herbicidal activity with respect to several genera of grasses is illustrated by the data in the above tables. The botanical types of grasses which are effectively controlled by means of the bromobenzamides of this invention embrace a large number of undesired plants, or weeds, frequently found in vegetable crops. This invention is not limited to the elimination of grasses in the presence of broad leaf plants, but also extends to the elimination of undesirable grasses in the presence of other narrow leaf plants, e.g., corn. In addition, certain undesirable broad leafed plants, i.e., those in the same respective plant families as sugar beets, buckwheat and pigweed, for example, may be effectively controlled while valuable broad leafed plants in the same plant family as cotton, for example, are completely unaffected.

*Example IV.—Dust formulations*

The following compositions are adapted for direct application as dusts for the destruction or prevention of weeds using conventional applicator equipment. The dusts are mixed by blending or mixing the ingredients and grading the mix to give compositions having an average particle size less than about 50 microns.

I

| | Parts |
|---|---|
| N,N-diallyl-3-bromobenzamide | 20 |
| Bentonite | 80 |
| | 100 |

II

| | |
|---|---|
| N,N-diallyl-4-bromobenzamide | 8 |
| Pyrophyllite | 92 |
| | 100 |

*Example V.—Water-dispersible powders*

The following powdered compositions are adapted for dispersing in water for application as a spray for the destruction and prevention of weeds. The powdered compositions are made by intimately mixing the listed ingredients, using conventional mixing or blending equipment, and then grinding the mixture to give a powder having an average particle size less than about 50 microns.

(I)

| | Parts |
|---|---|
| N,N-diallyl-3-bromobenzamide | 70 |
| Sodium disulfonate of dibutylphenyl phenol (wetting and dispersing agent) | 2 |
| Bentonite | 28 |
| | 100 |

(II)

| | |
|---|---|
| N,N-diallyl-4-bromobenzamide | 75 |
| Fuller's earth | 23 |
| Sodium lauryl sulfate, 50% (wetting agent) | 1.75 |
| Methyl cellulose, 15 cps. (dispersing agent) | 0.25 |
| | 100.00 |

*Example VI.—Granular compositions*

The following compositions are adapted for application by means of a fertilizer spreader apparatus or similar equipment. The compositions are readily prepared by mixing the ingredients with water to form a paste. The paste is then extruded, dried and ground to give the desired granular size. Preferably, the granules will be in the order of one thirty-second to one quarter inch in diameter.

(I)

| | Parts |
|---|---|
| N,N-diallyl-3-bromobenzamide | 11 |
| Goulac (dispersing agent) | 4 |
| Hydrocarbon oil | 1 |
| Dextrin (binding agent) | 19 |
| Fuller's earth | 65 |
| | 100 |

(II)

| | |
|---|---|
| N,N-diallyl-4-bromobenzamide | 9 |
| Goulac | 4 |
| Kerosene | 2 |
| Gelatin | 25 |
| Talc | 60 |
| | 100 |

*Example VII.—Oil-water dispersible powders*

The following powdered compositions are adapted for use in the preparation of spray compositions using either oil, water or a combination of oil and water as the liquid diluent. The powders are made by mixing and grinding as in the case of the powders of Example IV.

(I)

| | Parts |
|---|---|
| N,N-diallyl-3-bromobenzamide | 75 |
| Ethylene oxide stearate-laurate (emulsifying agent) | 5 |
| Pyrophyllite | 20 |
| | 100 |

(II)

| | |
|---|---|
| N,N-diallyl-4-bromobenzamide | 65 |
| Alkylated aryl polyether alcohol (wetting and dispersing agent) | 8 |
| Fuller's earth | 27 |
| | 100 |

*Example VIII.—Water-dispersible liquid compositions*

The following compositions are in liquid form and are adapted to give aqueous dispersions for application as sprays. In the case of some of the benzamides, the compositions will not be complete solutions, but rather will be dispersions of solid in the solvent used. The liquid of fluid compositions shown are prepared by thoroughly mixing or dispersing the active compounds and one or more conditioning agents such as dispersing or emulsifying agents, in an organic liquid diluent.

(I)

| | Parts |
|---|---|
| N,N-diallyl-3-bromobenzamide | 24 |
| Long chain fatty alcohol sulfate (emulsifying agent) | 4 |
| Methyl cellulose (dispersing agent) | 3 |
| Methylethyl ketone | 69 |
| | 100 |

(II)

| | |
|---|---|
| N,N-diallyl-4-bromobenzamide | 38 |
| Alkylated aryl polyether alcohol (wetting and dispersing agent) | 7 |
| Methyl isobutyl ketone | 55 |
| | 100 |

While this invention has been described with respect to certain embodiments, it is not so limited, and it is to be understood that variations and modifications thereof obvious to those skilled in the art may be made without departing from the spirit of this invention.

We claim:
1. The method of inhibiting the germination and growth of plants which comprises applying to the soil a herbicidal amount of a compound of the structure,

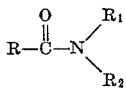

wherein R is selected from the group consisting of 3-bromophenyl and 4-bromophenyl radicals $R_1$ is selected from the group consisting of lower alkenyl radicals and lower alkenyl radicals which contain halogen linked to unsaturated carbon, and $R_2$ is selected from the group consisting of $R_1$ and lower alkyl radicals.

2. The method of inhibiting the germination and growth of plants comprising desired and undesired species in the same soil which comprises applying to the soil a herbicidal amount of a compound of the structure,

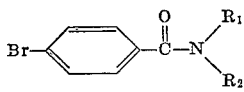

wherein $R_1$ and $R_2$ are lower alkenyl radicals.

3. The method of claim 2 wherein the compound is N,N-diallyl-4-bromobenzamide.

4. The method of inhibiting the germination and growth of plants comprising desired and undesired species in the same soil which comprises applying to the soil a herbicidal amount of a compound of the structure,

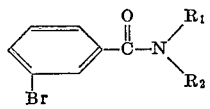

wherein $R_1$ and $R_2$ each represent an allyl radical which may contain halogen linked to the unsaturated carbon.

5. The method of claim 4 wherein the compound is N,N-diallyl-3-bromobenzamide.

References Cited by the Examiner
UNITED STATES PATENTS

| | | | |
|---|---|---|---|
| 2,551,891 | 5/1951 | Martin | 167—30 |
| 2,937,204 | 5/1960 | Harris et al. | 71—2.6 |
| 3,014,063 | 12/1961 | McLane et al. | 71—2.6 |
| 3,077,498 | 2/1963 | Baker et al. | 71—2.6 |

OTHER REFERENCES

Pizey et al., J. Sci. Food Agric., vol. 10, No. 11, Nov. 1959, pages 577–584.

Thompson et al., Botanical Gazette, vol. 107 (1946), pages 475 to 507.

LEWIS GOTTS, *Primary Examiner.*